(12) United States Patent
Xia et al.

(10) Patent No.: US 12,360,333 B2
(45) Date of Patent: Jul. 15, 2025

(54) VIRTUAL REALITY DEVICE, LENS BARREL POSITIONAL STATE DETECTION METHOD AND APPARATUS THEREFOR, AND MEDIUM

(71) Applicant: Beijing Zitiao Network Technology Co., Ltd., Beijing (CN)

(72) Inventors: Jiu Xia, Beijing (CN); Guanghui Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/813,906

(22) Filed: Aug. 23, 2024

(65) Prior Publication Data

US 2024/0411103 A1 Dec. 12, 2024

Related U.S. Application Data

(63) Continuation of application No. PCT/CN2023/077286, filed on Feb. 21, 2023.

(30) Foreign Application Priority Data

Feb. 25, 2022 (CN) .......................... 202210179425.8

(51) Int. Cl.
  *G02B 7/12* (2021.01)
  *G02B 27/00* (2006.01)
  *G02B 27/01* (2006.01)

(52) U.S. Cl.
  CPC ........... *G02B 7/12* (2013.01); *G02B 27/0093* (2013.01); *G02B 2027/0154* (2013.01); *G02B 27/0176* (2013.01)

(58) Field of Classification Search
  CPC .. G02B 7/12; G02B 27/0093; G02B 27/0176; G02B 2027/0154

(Continued)

(56) References Cited

U.S. PATENT DOCUMENTS

| | | | |
|---|---|---|---|
| 10,674,141 B1 | 6/2020 | Zhang et al. | |
| 2022/0382063 A1* | 12/2022 | Xia | ...................... G02B 27/017 |

FOREIGN PATENT DOCUMENTS

| | | |
|---|---|---|
| CN | 209858860 U | 12/2019 |
| CN | 213423605 U | 6/2021 |
| CN | 113489966 A | 10/2021 |

OTHER PUBLICATIONS

International Search Report and Written Opinion received for PCT Patent Application No. PCT/CN2023/077286, mailed on May 29, 2023, 6 pages (2 pages of English Translation and 4 pages of Original Document).

* cited by examiner

*Primary Examiner* — Wyatt A Stoffa
*Assistant Examiner* — Mitchell T Oestreich

(57) ABSTRACT

The present disclosure provides a virtual reality device, a lens barrel positional state detection method and apparatus therefor, and a medium. The device comprises: a lens barrel module, a magnet, a magnetic sensor, and a main controller, wherein one of the magnet and the magnetic sensor is embedded on a lens barrel housing of the lens barrel module, and the other one is fixed at a corresponding preset position of the lens barrel module; wherein the main controller controls the lens barrel module to move and detects an output electrical signal of the magnetic sensor when the lens barrel module moves so as to determine a positional state of the lens barrel module.

17 Claims, 3 Drawing Sheets

(58) Field of Classification Search
USPC .......................................................... 359/412
See application file for complete search history.

VIRTUAL REALITY DEVICE, LENS BARREL POSITIONAL STATE DETECTION METHOD AND APPARATUS THEREFOR, AND MEDIUM

CROSS REFERENCE TO RELATED APPLICATION(S)

The present application is a continuation application of International Patent Application No. PCT/CN2023/077286, filed Feb. 21, 2023, which claims the priority of Chinese patent application No. 202210179425.8 filed on Feb. 25, 2022 and entitled "Virtual Reality Device, lens barrel positional state Detection Method and Apparatus thereof, and Medium". The entire contents of the present application are incorporated herein by reference.

FIELD

Embodiments of the present application relate to the technical field of virtual reality, and in particular, to a virtual reality device, a lens barrel positional state detection method and apparatus thereof, and a medium.

BACKGROUND

With the rapid development of Virtual Reality (VR) technology, more and more users seek immersive experience of a variety of rich three-dimensional game content in the virtual environment by wearing VR devices. With this regard, users' different interpupillary distances lead to different optimal imaging positions of the left and right lens barrels in the VR device. Therefore, in order to improve the comfort of the VR device and provide the user with the best visual effect, it is generally necessary to adaptively adjust the positions of the left and right lens barrels in the VR device according to the interpupillary distance of different users.

At present, a VR device generally uses a motor to rotate to drive a transmission mechanism, and then the transmission mechanism drives the left and right lens barrels to move, so as to complete the position adjustment of the left and right lens barrels in the VR device based on the interpupillary distance of a user. However, there is a consideration as to that the motor cannot drive the lens barrel to move when rotating as a result of the left and right lens barrels in the VR device being stuck by an object or the user unintentionally holding the lens barrel during the position adjustment, and the continuous operation of the motor will cause the wear of components in the transmission mechanism and the heating of the motor, and this greatly affects the service performance of the VR device and shortens the service life of the VR device.

For this, when it is determined whether the left and right lens barrels in the VR device are stuck by installing a photoelectric element or a mechanical limit detection switch at a fixed position, the photoelectric element or the mechanical limit detection switch needs to be installed at every moving position as the left and right lens barrels may be stuck at any moving position, and this greatly increases the cost of the lens barrel position detection in the VR device and the complexity of the device.

SUMMARY

The present application provides a VR device, a lens barrel positional state detection method and apparatus thereof, and a medium, achieving real-time detection of a positional state of the lens barrel module in the VR device during movement, reducing the complexity of detection of the lens barrel positional state in the VR device, thereby reducing the setting cost of detection of the lens barrel positional state in the VR device.

In a first aspect, embodiments of the present application provide a virtual reality (VR) device, comprising: a lens barrel module, a magnet, a magnetic sensor and a main controller, wherein one of the magnet and the magnetic sensor is embedded on a lens barrel housing of the lens barrel module, and the other one is fixed at a corresponding preset position of the lens barrel module; wherein, the main controller controls the lens barrel module to move and detects an output electrical signal of the magnetic sensor during movement of the lens barrel module so as to determine a positional state of the lens barrel module.

In a second aspect, embodiments of the present application provide a lens barrel positional state detection method applied to the VR device of the first aspect, comprising:

detecting an output electrical signal of a magnetic sensor during movement of the lens barrel module;

determining a positional state of the lens barrel module according to the output electrical signal based on a movement instruction of the lens barrel module.

In a third aspect, embodiments of the present application provide a lens barrel positional state detection apparatus configured in the VR device according to the first aspect, comprising:

an output electrical signal detection module for detecting an output electrical signal of a magnetic sensor during movement of the lens barrel module;

a lens barrel positional state determination module for determining a positional state of the lens barrel module according to the output electrical signal based on a movement instruction of the lens barrel module.

In a fourth aspect, embodiments of the present application provide a computer-readable storage medium for storing a computer program for causing a computer to execute the lens barrel positional state detection method according to the second aspect.

In a fifth aspect, embodiments of the present application provide a computer program product comprising computer programs/instructions which, when executed by a processor, implement the lens barrel positional state detection method according to the second aspect.

Embodiments of the present application provide a VR device, a lens barrel positional state detection method and apparatus thereof, and a medium. One of the magnet and the magnetic sensor is embedded on the lens barrel housing of the lens barrel module in the VR device, and the other of the magnet and the magnetic sensor is fixed at the corresponding preset position of the lens barrel module. Furthermore, when the main controller controls the movement of the lens barrel module, one of the magnet and the magnetic sensor is driven to correspondingly move, and then the output electrical signal of the magnetic sensor during movement of the lens barrel module is detected. The positional state of the lens barrel module can be determined according to the output electrical signal so as to realize the real-time detection of a positional state of the lens barrel module during movement of the lens barrel module in the VR device. It is not necessary to set the light point element or the mechanical limit detection switch at each position during the movement of the lens barrel module to detect the positional state. The simple layout arrangement of the magnetic sensor and the magnet reduces the complexity of detecting the positional state of lens barrels in the VR device, and thus also reduces the setting costs of detecting the positional state of lens barrels in the VR device.

BRIEF DESCRIPTION OF THE DRAWINGS

In order to explain the technical solutions of the embodiments of the present application more clearly, the following description is given with reference to the drawings which are required to be used in the depiction of the embodiments. It is obvious that the figures in the following description are only for some embodiments of the present application, and a person of ordinary skill in the art would be able to obtain other ones according to these figures without involving any inventive effort.

DETAILED DESCRIPTION OF EMBODIMENTS

Figure 1:
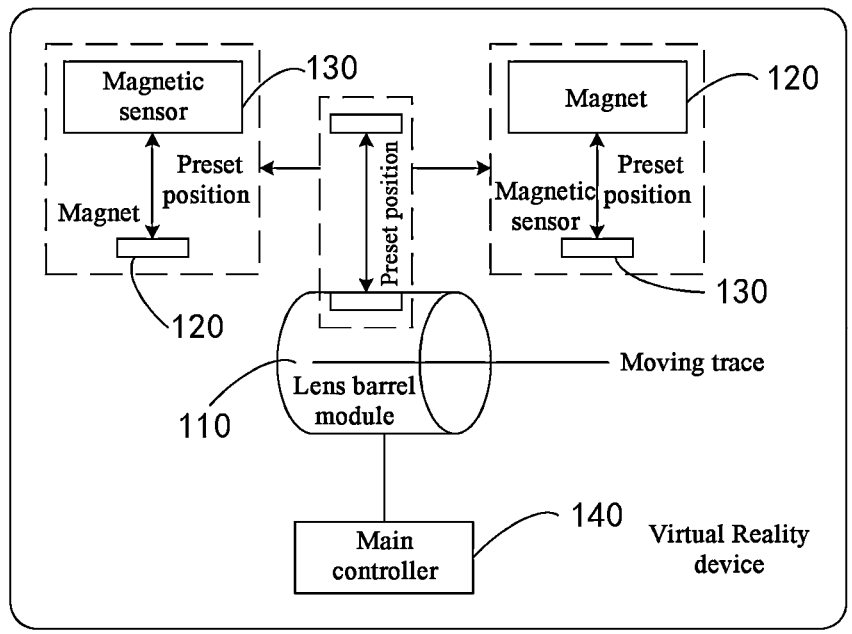
FIG. 1 is a block diagram of a VR device according to an embodiment of the present application.

In the following, the technical solution in the embodiment of the present application will be clearly and completely described with reference to the drawings in the embodiments. Obviously, the described embodiment is only a part of the embodiments of the application, but not all embodiments. Based on the embodiments in the present application, all the other embodiments obtained by a person of ordinary skill in the art without making any inventive effort fall within the scope of protection of the present application.

It should be noted that the terms "first", "second", and the like in the description and the claims of the present application and the above-described figures are used for distinguishing similar objects and not necessarily for describing a particular sequential or chronological order. It is to be understood that the data so used are interchangeable under appropriate circumstances such that the embodiments of the application described herein are capable of operation in sequences other than those illustrated or otherwise described herein. Moreover, the terms "comprises" and "comprising", and any variation thereof, are intended to cover a non-exclusive inclusion, such that a process, method, system, article, or server that comprises a list of steps or elements is not necessarily limited to those steps or elements expressly listed, but may include other steps or elements not expressly listed or inherent to such process, method, article, or device.

Before introducing the technical solution of the present application, the following is a depiction of an existing structure of controlling the movement of the lens barrel according to the user's interpupillary distance in the VR device:

A head-mounted display in a VR device for simulating a virtual environment for a user may include a main controller, a Digital Signal Processing (DSP) module, a memory, a memory, a position sensor, a camera, a radio frequency wireless transmission circuit and an antenna, etc. After the user wears the VR device, an image of the current user's eyes may be acquired through a camera in which the user's eye data is exclusively acquired. Thus, the interpupillary distance of the current user is analyzed using image processing techniques to determine the lens barrel position within the VR device. Then, the main controller within the VR device controls the lens barrel to move to this position so that the user achieves an optimal visual effect and enhances the user's immersive experience and comfort in the virtual space.

In particular, a corresponding motor and a transmission mechanism may be provided in the VR device. After determining the lens barrel position corresponding to the user's interpupillary distance, the main controller will first send a rotation command to the motor to control the motor to rotate. At this time, when the motor rotates, the transmission mechanism is driven to work, and then the transmission mechanism drives the lens barrel to move to a position corresponding to the interpupillary distance of the user.

As stated above, there is a consideration as to that the motor cannot drive the lens barrel to move when rotating as a result of the left and right lens barrels in the VR device being stuck by an object or the user unintentionally holding the lens barrel during the position adjustment, and the continuous operation of the motor will cause the wear of components in the transmission mechanism and the heating of the motor, and this greatly affects the service performance of the VR device and shortens the service life of the VR device.

In the existing solutions, when it is determined whether the left and right lens barrels in the VR device are stuck by installing a photoelectric element or a mechanical limit detection switch at a fixed position, the photoelectric element or the mechanical limit detection switch needs to be installed at every moving position as the left and right lens barrels may be stuck at any moving position, and this greatly increases the cost of the lens barrel position detection in the VR device and the complexity of the device.

In order to solve the above-mentioned technical problem, on the basis of the existing structure of the VR device controlling the movement of the lens barrel, the present application would embed one of the magnet and the magnetic sensor on the lens barrel housing of the lens barrel module, and fix the other of the magnet and the magnetic sensor at the corresponding preset position of the lens barrel module. Furthermore, when the main controller controls the movement of the lens barrel module, one of the magnet and the magnetic sensor is driven to correspondingly move, and then the output electrical signal of the magnetic sensor during movement of the lens barrel module is detected. The positional state of the lens barrel module can be determined according to the output electrical signal so as to realize the real-time detection of a positional state of the lens barrel module during movement of the lens barrel module in the VR device. The simple layout arrangement of the magnetic sensor and the magnet reduces the complexity of detecting the positional state of lens barrels in the VR device, and thus also reduces the setting costs of detecting the positional state of lens barrels in the VR device.

The technical solution of the present application will be described in detail as follows:

FIG. 1 is a block diagram of a VR device according to an embodiment of the present application. As shown in FIG. 1, the VR device includes a lens barrel module 110, a magnet 120, a magnetic sensor 130, and a main controller 140.

one of the magnet 120 and the magnetic sensor 130 is embedded on a lens barrel housing of the lens barrel module 110, and the other one is fixed at a corresponding preset position of the lens barrel module 110; wherein, Specifically, the main controller 140 controls the lens barrel module 110 to move, and detects an output electrical signal of the magnetic sensor 130 when the lens barrel module 110 moves to determine the lens barrel module 110 positional state.

In the present application, in order to reduce the complexity of the device when detecting the lens barrel positional state in the VR device, it is required to add some simple module layouts in the VR device to determine whether the lens barrel is stuck when the motor rotates to drive the movement of the lens barrel. Therefore, by virtue of the feature that the magnetic sensor has a magnetic field strength which varies with the distance from the magnet and a corresponding change occurs in the output electrical signal, the present application will embed one of the magnet 120 and the magnetic sensor 130 on the lens barrel housing of the lens barrel module 110 of the VR device, and fix the other of the magnet 120 and the magnetic sensor 130 at the corresponding preset position of the lens barrel module 110.

Further, the main controller 140 moves one of the magnet 120 and the magnetic sensor 130 when the lens barrel module 110 is controlled to move by the motor. Since the other of the magnet 120 and the magnetic sensor 130 is fixed at the corresponding preset position of the lens barrel module 110, during the movement of the lens barrel module 110, the distance between the magnet 120 and the magnetic sensor 130 changes continuously, resulting in a corresponding change in the magnetic field strength of the magnetic sensor 130. Then, as the magnetic field strength of the magnetic sensor 130 changes, the output electrical signal of the magnetic sensor 130 changes accordingly.

Accordingly, the main controller 140 continuously sends a normal movement instruction to the lens barrel module 110 to control the lens barrel module 110 to perform a corresponding movement operation. Meanwhile, the output electrical signal of the magnetic sensor 130 is detected during the movement of the lens barrel module 110. The main controller 140 analyzes whether the lens barrel module 110 performs a real movement operation after receiving a corresponding movement instruction by determining whether the output electrical signal of the magnetic sensor 130 changes, so as to determine whether the lens barrel module 110 is abnormally stuck during the movement, thereby determining the lens barrel module 110 positional state during the movement.

The movement instruction sent by the main controller 140 to the lens barrel module 110 may be a motor rotation command when the lens barrel module 110 is driven to move by controlling the motor to rotate.

It should be noted that in the present application, the magnet 120 can be embedded on the lens barrel housing of the lens barrel module 110, and the magnetic sensor 130 can be fixed at the corresponding preset position of the lens barrel module 110. At this time, when the main controller 140 controls the movement of the lens barrel module 110 by the motor, the magnet 120 moves accordingly. Since the magnetic sensor 130 is fixed at the corresponding preset position of the lens barrel module 110, during the movement of the lens barrel module 110, the distance between the magnet 120 and the magnetic sensor 130 changes continuously, resulting in a corresponding change in the magnetic field strength of the magnetic sensor 130. Thus, a corresponding change occurs in the output electrical signal of the magnetic sensor 130.

Meanwhile, the output electrical signal of the magnetic sensor 130 in the present application may be an output voltage. During the movement of the lens barrel module 110, the main controller 140 determines the lens barrel module 110 positional state during the movement by detecting whether the output voltage of the magnetic sensor 130 changes.

The lens barrel module 110 positional state in the present application can comprise two situations: the lens barrel module 110 is abnormally stuck during movement, and the lens barrel module 110 moves to a preset limit position so that the lens barrel module 110 cannot continue to move.

In addition, in order to timely determine the lens barrel module 110 positional state during movement, the present application can timely determine whether the lens barrel module 110 is abnormally stuck or whether the lens barrel module 110 moves to a preset limit position by detecting in real time whether the output electrical signal of the magnetic sensor 130 changes.

It should be noted that, in the case where the detection requirements are satisfied, the present application can also detect the output electrical signal of the magnetic sensor 130 at shot time intervals so as to determine the lens barrel module 110 positional state. Further, the lens barrel module 110 in the present application may comprise two parts, the left lens barrel and the right lens barrel. At this time, in different scenarios, there may be different requirements for the movement modes of the left lens barrel and the right lens barrel, for example, the main controller 140 jointly drives the left lens barrel and the right lens barrel to perform synchronous movement via a motor, or the main controller 140 respectively drives the left lens barrel and the right lens barrel to perform independent movement via different motors.

According to the above-mentioned two movement scenes of lens barrel module 110, there are also different detection requirements for lens barrel module 110 positional state when the left lens barrel and the right lens barrel move.

Illustratively, if the main controller 140 controls the left and right barrels to move synchronously, when either of the left and right barrels is abnormally stuck during the movement, neither of the left and right barrels can normally perform the movement operation. Therefore, in the present application, one of the magnet 120 and the magnetic sensor 130 can be embedded on the housing of at least one of the left and right lens barrels in the lens barrel module 110, and the other of the magnet 120 and the magnetic sensor 130 can be fixed at the preset position corresponding to the lens barrel in which the one of the magnet 120 and the magnetic sensor 130 is embedded. According to the above-mentioned structure, it is possible to accurately analyze the change of the output electrical signal of the magnetic sensor 130 during the movement of the lens barrel module 110, and then determine whether the lens barrel module 110 is abnormally stuck during the movement.

Illustratively, one of the magnet 120 and the magnetic sensor 130 is embedded in the housing of any one of the left and right barrels in the barrel module 110, or one of the magnet 120 and the magnetic sensor 130 is embedded in the housing of both the left and right barrels in the barrel module 110.

However, if the main controller 140 controls the left and right barrels to move separately, for each of the left and right barrels, it is necessary to determine whether the barrel is abnormally stuck during the movement. Therefore, in the present application, one of the magnet 120 and the magnetic sensor 130 can be respectively embedded in the housing of each of the left and right lens barrels, and the other of the magnet 120 and the magnetic sensor 130 can be respectively fixed at the preset position corresponding to each of the left and right lens barrels. According to the above-mentioned structure, it is possible to accurately determine whether each of the left and right lens barrels is abnormally stuck during the movement of the lens barrel by analyzing the change of the output electrical signal of the magnetic sensor 130 associated with each lens barrel.

As an alternative implementation in the present application, on the one hand, a section of the magnet 120 in the present application is provided with a notch mark, so as to distinguish two poles of the magnet 120 and prevent the magnet 120 from being reversely installed.

Figure 2:
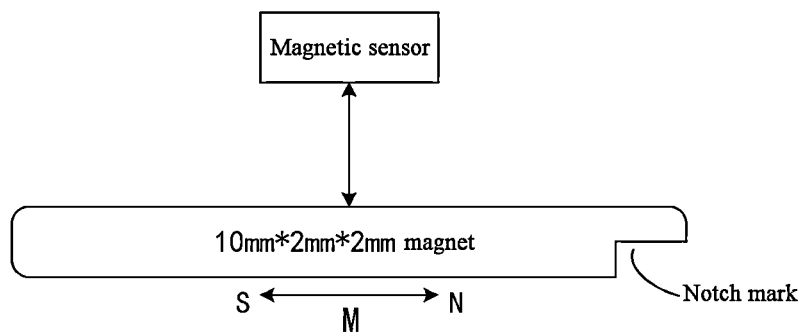
FIG. 2 is a block diagram of a configuration of a magnet provided in the VR device according to an embodiment of the present application.

Illustratively, as shown in FIG. 2, the magnet 120 of the present application may be a 10 mm×2 mm×2 mm magnet.

On the other hand, the magnetic sensor 130 in the present application may be the linear Hall sensor. As shown in FIG. 2, when the linear Hall sensor is provided in the VR device, the corresponding preset position of the lens barrel module 110 may be a position where one of the magnet 120 and the linear Hall sensor provided in the lens barrel module 110 has a fixed distance from the other.

Figure 3:
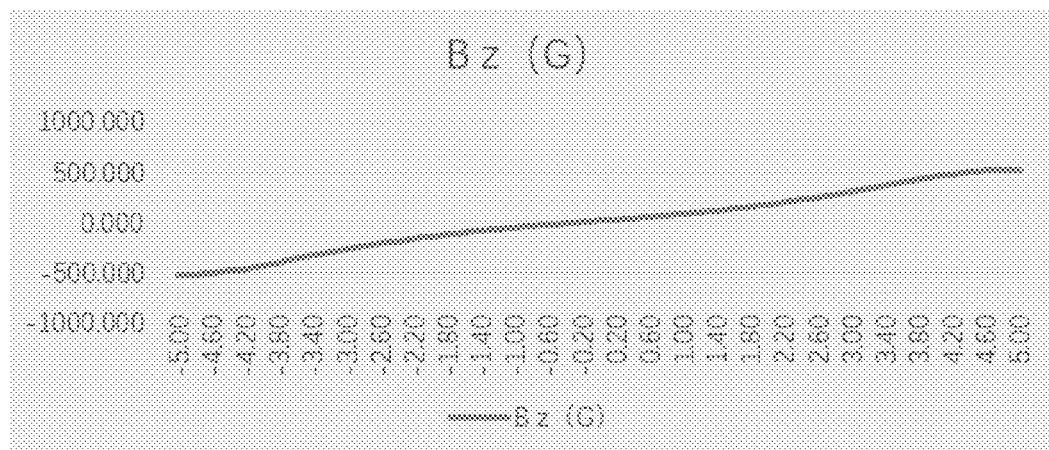
FIG. 3 is a schematic diagram illustrating changes in magnetic field strength sensed by a linear Hall sensor during movement of a lens barrel module according to an embodiment of the present application.
Figure 4:
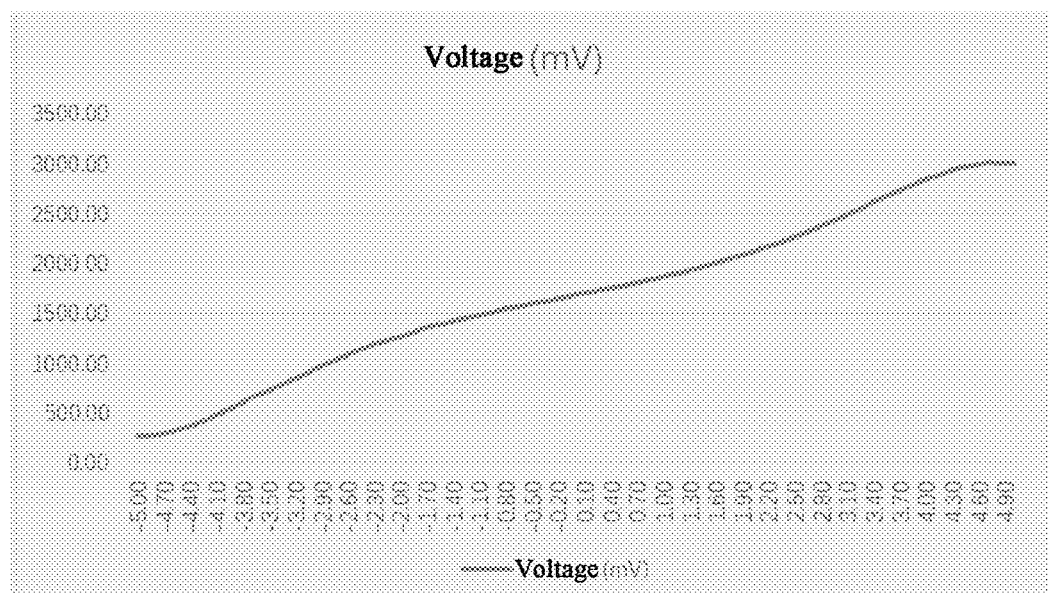
FIG. 4 is a schematic diagram illustrating an output voltage change of a linear Hall sensor during the movement of a lens barrel module according to an embodiment of the present application.

By way of example, in the present application, the linear Hall sensor switch can be selected to be 2.64 mV/Gs, and then during the movement of the lens barrel module 110, the magnetic field intensity variation sensed by the linear Hall sensor changes as shown in FIG. 3. Meanwhile, the linear Hall sensor outputs a voltage variation in real time according to the sensed magnetic field intensity variation as shown in FIG. 4.

At this time, there are two cases in which the lens barrel module 110 is stuck by an object during the movement of the lens barrel module 110, one is that the lens barrel module 110 is abnormally stuck by the object during movement, and the other one is that the lens barrel module 110 moves to the preset limit position so that the lens barrel module 110 cannot continue to move.

Therefore, when determining the lens barrel module 110 positional state during the movement according to the output electrical signal of the magnetic sensor 130, it is necessary to accurately distinguish the above two cases. When the main controller 140 controls the lens barrel module 110 to perform a movement operation, a movement instruction is sent to the lens barrel module 110 in real time. Then, whether the motor controlling the movement of the lens barrel module 110 is in a normal rotation state is analyzed by determining whether the main controller 140 normally generates the movement instruction of the lens barrel module 110 within a preset time period. If the movement instruction of the lens barrel module 110 can be normally generated within a preset time period, it indicates that the lens barrel module 110 still needs to perform a real movement operation currently. Then, considering that the output electrical signal of the magnetic sensor 130 changes when the lens barrel module 110 performs the real movement operation, it is determined whether the lens barrel module 110 performs a real movement operation after a movement instruction of the lens barrel module 110 is normally initiated by analyzing whether the output electrical signal of the magnetic sensor 130 changes within a preset time period, so as to determine whether the lens barrel module 110 is abnormally stuck during movement. That is, if the movement instruction of the lens barrel module 110 can be normally generated within the preset time period, and the output electrical signal of the magnetic sensor 130 is unchanged, it means that the lens barrel module 110 does not perform a real movement operation according to the movement instruction, thereby determining that the lens barrel module 110 is abnormally stuck during movement.

Further, it is considered that the relative distance between the magnet 120 and the magnetic sensor 130 is maximally changed when the lens barrel module 110 is moved to the limit position, so that the output electrical signal of the magnetic sensor 130 can reach the corresponding limit electrical signal. Therefore, if it is determined that the movement instruction of the lens barrel module 110 is normally generated within the preset time period, and the output electrical signal does not change, it is necessary to further determine whether the lens barrel module 110 is stuck during the movement or moves to a limit position and stops moving. Therefore, on this basis, it is further determined whether the output electrical signal of the magnetic sensor 130 reaches the limit electrical signal during the movement of the lens barrel module 110, so as to analyze the position where the lens barrel module 110 is stuck during movement, for example, determining whether the output voltage of the magnetic sensor 130 reaches the limit voltage during the movement of the lens barrel module 110. If the output electrical signal of the magnetic sensor reaches the limit electrical signal value at the time when the lens barrel module 110 moves, it is determined that the lens barrel module moves to the preset limit position. However, if the output electrical signal of the magnetic sensor 130 does not reach the limit electrical signal value at the time when the lens barrel module 110 moves, it is determined that the lens barrel module moves halfway and becomes stuck.

According to the technical solution provided by the embodiments of the present application, one of the magnet and the magnetic sensor is embedded on the lens barrel housing of the lens barrel module in the VR device, and the other of the magnet and the magnetic sensor is fixed at the corresponding preset position of the lens barrel module. Furthermore, when the main controller controls the movement of the lens barrel module, one of the magnet and the magnetic sensor is driven to correspondingly move, and then the output electrical signal of the magnetic sensor during movement of the lens barrel module is detected. The positional state of the lens barrel module can be determined according to the output electrical signal so as to realize the real-time detection of the positional state of the lens barrel module during movement of the lens barrel module in the VR device. It is not necessary to set the light point element or the mechanical limit detection switch at each position during the movement of the lens barrel module to detect the positional state. The simple layout arrangement of the magnetic sensor and the magnet reduces the complexity of detecting the positional state of lens barrels in the VR device, and thus also reduces the setting costs of detecting the positional state of lens barrels in the VR device.

The specific steps of detecting whether the lens barrel module is stuck during the movement in the VR device will be described in detail.

Figure 5:
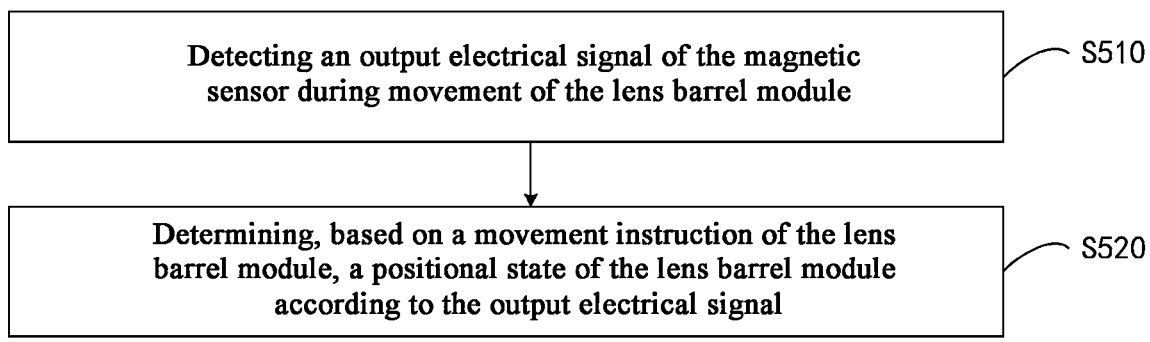
FIG. 5 is a flow chart of a lens barrel positional state detection method according to an embodiment of the present application.

FIG. 5 is a flow chart of a lens barrel positional state detection method according to an embodiment of the present application, and the embodiment herein is mainly applied to the VR device provided in the above embodiment. Referring to FIG. 5, the method may specifically include the following steps:

S510, detecting the output electrical signal of the magnetic sensor during the movement of the lens barrel module;

Specifically, in order to reduce the complexity of the device when detecting the lens barrel positional state in the VR device, the present application, by virtue of the feature that the magnetic sensor has a magnetic field strength which varies with the distance from the magnet and a corresponding change occurs in the output electrical signal, the present application will embed one of the magnet and the magnetic sensor on the lens barrel housing of the lens barrel module in the VR device, and fix the other of the magnet and the magnetic sensor at the corresponding preset position of the lens barrel module.

Further, the main controller moves one of the magnet and the magnetic sensor when the lens barrel module is controlled to move by the motor. Since the other of the magnet and the magnetic sensor is fixed at the corresponding preset position of the lens barrel module, during the movement of the lens barrel module, the distance between the magnet and the magnetic sensor changes continuously, a corresponding change occurs in the magnetic field strength of the magnetic sensor. Then, as the magnetic field strength of the magnetic sensor changes, the output electrical signal of the magnetic sensor changes accordingly.

For example, in the present application, the magnet can be embedded on the lens barrel housing of the lens barrel module, and the magnetic sensor can be fixed at the corresponding preset position of the lens barrel module. When the main controller controls the movement of the lens barrel module via the motor, the magnet is driven to correspondingly move. Since the magnetic sensor is fixed at the corresponding preset position of the lens barrel module, during the movement of the lens barrel module, the distance between the magnet and the magnetic sensor will continuously change, a corresponding change in the magnetic field strength of the magnetic sensor occurs, and thus a corresponding change occurs in the output electrical signal of the magnetic sensor.

Therefore, the main controller continuously sends the normal movement instruction to the lens barrel module to control the lens barrel module to perform the corresponding movement operation. At the same time, during the movement of the lens barrel module, whether the output electrical signal of the magnetic sensor changes is detected.

The movement instruction sent by the main controller to the lens barrel module may be a motor rotation command when the lens barrel module is driven to move by controlling the motor to rotate.

Illustratively, the output electrical signal of the magnetic sensor in the present application is an output voltage. During the movement of the lens barrel module, the main controller determines the positional state of the lens barrel module during the movement by detecting whether the output voltage of the magnetic sensor changes.

In addition, in order to timely determine the positional state of the lens barrel module during movement, the present application can timely determine whether the lens barrel module is stuck during movement by detecting in real time whether the output electrical signal of the magnetic sensor changes.

It should be noted that, in the case where the detection requirements are satisfied, the present application can also detect the output electrical signal of the magnetic sensor at short time intervals so as to determine the positional state of the lens barrel module.

S520, determining the positional state of the lens barrel module according to the output electrical signal based on a movement instruction of the lens barrel module.

In the present application, the main controller continuously sends the normal movement instruction to the lens barrel module, indicating that the lens barrel module still needs to perform a real movement operation currently. Then, by determining whether the output electrical signal of the magnetic sensor changes, it is analyzed whether the lens barrel module performs the real movement operation after receiving a corresponding movement instruction, thereby determining whether the lens barrel module is abnormally stuck during the movement and determining the positional state of the lens barrel module during the movement.

At this time, there are two cases in which the lens barrel module is stuck by an object during the movement, one is that the lens barrel module is abnormally stuck by the object during movement, and the other one is that the lens barrel module moves to the preset limit position so that the lens barrel module cannot continue to move. Therefore, when determining the positional state of the lens barrel module in the moving process according to the output electrical signal of the magnetic sensor, it is necessary to accurately distinguish the above-mentioned two cases.

Therefore, when the main controller controls the lens barrel module to perform the movement operation, the movement instruction is sent to the lens barrel module in real time. Then, whether the motor controlling the movement of the lens barrel module is in a normal rotation state is analyzed by determining whether the main controller generates the movement instruction of the lens barrel module normally within the preset time period. If the movement instruction of the lens barrel module can be normally generated within the preset time period, it indicates that the lens barrel module still needs to perform a real movement operation. Then, considering that the output electrical signal of the magnetic sensor changes when the lens barrel module performs the real movement operation, it is determined whether the lens barrel module performs the real movement operation after a movement instruction of the lens barrel module is normally initiated by analyzing whether the output electrical signal of the magnetic sensor changes within a preset time period, so as to determine whether the lens barrel module is abnormally stuck during movement. That is, if the movement instruction of the lens barrel module can be normally generated within the preset time period, and the output electrical signal of the magnetic sensor is unchanged, it means that the lens barrel module does not perform a real movement operation according to the movement instruction, thereby determining that the lens barrel module is abnormally stuck during movement.

Further, it is considered that the relative distance between the magnet and the magnetic sensor is maximally changed when the lens barrel module moves to the limit position, so that the output electrical signal of the magnetic sensor can reach the corresponding limit electrical signal. Therefore, if it is determined that the movement instruction of the lens barrel module is normally generated within the preset time period, and the output electrical signal does not change, it is necessary to further determine whether the lens barrel module is stuck during the movement or moves to a limit position and stops moving. Therefore, on this basis, it is further determined whether the output electrical signal of the magnetic sensor reaches the limit electrical signal during the movement of the lens barrel module, so as to analyze the position where the lens barrel module is stuck during movement, for example, determining whether the output voltage of the magnetic sensor reaches the limit voltage during the movement of the lens barrel module. If the output electrical signal of the magnetic sensor reaches the limit electrical signal value at the time when the lens barrel module moves, it is determined that the lens barrel module moves to the preset limit position. However, if the output electrical signal of the magnetic sensor does not reach the limit electrical signal value at the time during movement of the lens barrel module, it is determined that the lens barrel module moves halfway and becomes stuck.

According to the technical solution provided by the embodiments of the present application, one of the magnet and the magnetic sensor is embedded on the lens barrel housing of the lens barrel module in the VR device, and the other of the magnet and the magnetic sensor is fixed at the corresponding preset position of the lens barrel module, so that when the lens barrel module is controlled to move by the main controller, one of the magnet and the magnetic sensor is driven to move correspondingly, and then an output electrical signal of the magnetic sensor during movement of the lens barrel module is detected. The positional state of the lens barrel module can be determined according to the output electrical signal, thereby realizing real-time detection of the positional state of the lens barrel module during movement of the lens barrel module in the VR device. It is not necessary to set the light point element or the mechanical limit detection switch at each position during the movement of the lens barrel module to detect the positional state. The simple layout arrangement of the magnetic sensor and the magnet reduces the complexity of detecting the positional state of lens barrels in the VR device, and thus also reduces the setting costs of detecting the positional state of lens barrels in the VR device.

Figure 6:
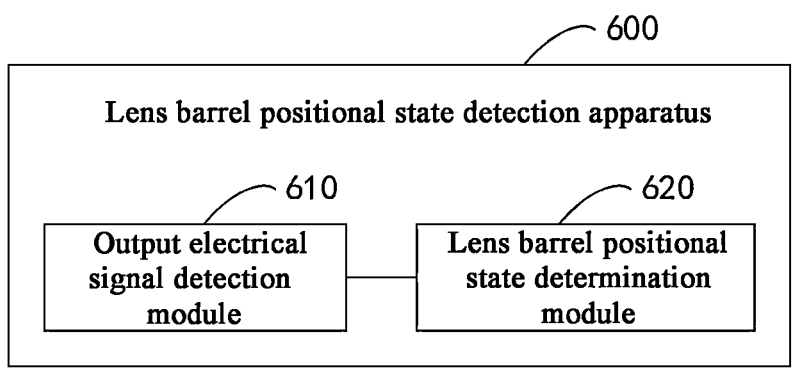
FIG. 6 is a schematic block diagram of a lens barrel positional state detection apparatus according to an embodiment of the present application.

FIG. 6 is a schematic block diagram of a lens barrel positional state detection apparatus according to an embodiment of the present application and this can be configured in the VR device provided in the above embodiment. As shown in FIG. 6, the apparatus 600 may include:

An output electrical signal detection module 610 for detecting the output electrical signal of the magnetic sensor during the movement of the lens barrel module;

A lens barrel positional state determination module 620 for determining the positional state of the lens barrel module according to the output electrical signal based on the movement instruction of the lens barrel module.

Furthermore, the output electrical signal detection module 610 can be specifically used for:
  detecting the output electrical signal of the magnetic sensor during the movement of the lens barrel module in real time.

Furthermore, the lens barrel positional state determination module 620 can be specifically used for:
  if the movement instruction of the lens barrel module is normally generated within the preset time period, and the output electrical signal is unchanged, determining that the lens barrel module is abnormally stuck during movement.

Furthermore, the lens barrel positional state determination module 620 can also be specifically used for:
  if the movement instruction of the lens barrel module is normally generated within the preset time period, and the output electrical signal is unchanged, and reaches the limit electrical signal during movement of the lens barrel module, determining that the lens barrel module moves to the preset limit position.

In the embodiments of the present application, one of the magnet and the magnetic sensor is embedded on the lens barrel housing of the lens barrel module in the VR device, and the other of the magnet and the magnetic sensor is fixed at the corresponding preset position of the lens barrel module, so that when the lens barrel module is controlled to move by the main controller, one of the magnet and the magnetic sensor is driven to move correspondingly, and then an output electrical signal of the magnetic sensor during movement of the lens barrel module is detected. The positional state of the lens barrel module can be determined according to the output electrical signal, thereby realizing real-time detection of the positional state of the lens barrel module during movement of the lens barrel module in the VR device. It is not necessary to set the light point element or the mechanical limit detection switch at each position during the movement of the lens barrel module to detect the positional state. The simple layout arrangement of the magnetic sensor and the magnet reduces the complexity of detecting the positional state of lens barrels in the VR device, and thus also reduces the setting costs of detecting the positional state of lens barrels in the VR device.

It should be understood that apparatus embodiments and method embodiments may correspond to each other and that similar descriptions may refer to method embodiments. In order to avoid repetition, it will not be repeated here. In particular, the apparatus 600 shown in FIG. 6 may perform any of the method embodiments provided herein, and the foregoing and other operations and/or functions of the various modules in the apparatus 600, respectively, in order to implement the corresponding flows in the various methods of embodiments of the present application, will not be described in detail herein for the sake of brevity.

The apparatus 600 of an embodiment of the present application is described above from the point of view of functional blocks in conjunction with the accompanying drawings. It is to be understood that the functional blocks may be implemented as hardware, as instructions in software, or as a combination of hardware and software blocks. In particular, the steps of an embodiment of the method disclosed in the embodiments of the present application may be performed by instructions in the form of integrated logic circuits in hardware and/or software in a processor, and the steps of the method disclosed in connection with the embodiments of the present application may be embodied directly in a hardware decoding processor for execution or in a combination of hardware and software modules in a decoding processor for execution. Alternatively, the software modules may reside in random access memory, flash memory, read only memory, programmable read only memory, electrically erasable programmable memory, registers, and the like, as is well known in the art. The storage medium is located in a memory, and the processor reads the information in the memory and, in conjunction with its hardware, performs the steps in the above-mentioned method embodiments.

Embodiments of the present application also provide a computer storage medium having stored thereon a computer program which, when executed by a computer, enables the computer to perform the methods of the above-described method embodiments. Stated alternatively, embodiments of the present application also provide a computer program product comprising instructions which, when executed by a computer, cause the computer to perform the methods of the above-described method embodiments.

When implemented in software, the computer storage medium may be implemented in whole or in part as a computer program product. The computer program product includes one or more computer instructions. The computer program instructions, when loaded and executed on a computer, result, in whole or in part, in processes or functions according to embodiments of the present application. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center via a wired (e.g., coaxial cable, fiber optic, digital subscriber line (DSL)) or wireless (e.g., infrared, wireless, microwave, etc.) means. The computer-readable storage medium can be any available medium that can be accessed by a computer or a data storage device including a server, a data center, etc. integrated with one or more available media. The usable medium may be a magnetic medium (e.g., a floppy disk, a hard disk, a magnetic tape), an optical medium (e.g., a digital video disc (DVD)), or a semiconductor medium (e.g., a solid state disk (SSD)), etc.

Those of skill in the art would recognize that the various illustrative modules and algorithm steps described in connection with the embodiments disclosed herein can be implemented as electronic hardware, or combinations of computer software and electronic hardware. Whether such functionality is implemented as hardware or software depends upon the particular application and design constraints imposed on the technical solution. Skilled artisans may implement the described functionality in varying ways for each particular application, but such implementation decisions should not be interpreted as causing a departure from the scope of the present application.

In the several embodiments provided herein, it should be understood that the disclosed systems, devices, and methods may be implemented in other ways. For example, the apparatus embodiments described above are merely illustrative, e.g., the partitioning of modules is merely a logical functional partitioning, and in actual implementation there may be additional partitioning, e.g., multiple modules or components may be combined or integrated into another system, or some features may be omitted, or not performed. In another aspect, the couplings or direct couplings or communication connections shown or discussed with respect to each other may be indirect couplings or communication connections through some interface, device, or module, and may be electrical, mechanical, or otherwise.

The modules illustrated as separate components may or may not be physically separated, and the components shown as modules may or may not be physical modules, i.e., may be located in one place, or may also be distributed over a plurality of network elements. Some or all of the modules may be selected according to actual needs to achieve the purpose of the solution of the present embodiment. For example, each functional module in various embodiments of the present application may be integrated in one processing module, may each module physically exist separately, or may two or more modules be integrated in one module.

While the present invention has been described with reference to the preferred embodiments, it will be understood by those skilled in the art that various changes may be made and equivalents may be substituted for elements thereof without departing from the scope of the invention. Therefore, the scope of protection of this application should be determined with reference to the claims.

We claim:

1. A virtual reality device, comprising: a lens barrel module, a magnet, a magnetic sensor, and a main controller, wherein one of the magnet and the magnetic sensor is embedded on a lens barrel housing of the lens barrel module, and the other one is fixed at a corresponding preset position of the lens barrel module; wherein,
the main controller controls the lens barrel module to move and detects an output electrical signal of the magnetic sensor during movement of the lens barrel module so as to determine a positional state of the lens barrel module, wherein the positional state of the lens barrel module comprises the lens barrel module being abnormally stuck during movement or the lens barrel module having moved to a preset limit position.

2. The device according to claim 1, wherein the lens barrel module comprises a left lens barrel and a right lens barrel;
if the main controller controls the left lens barrel and the right lens barrel to move synchronously, one of the magnet and the magnetic sensor is embedded on a housing of at least one lens barrel within the lens barrel module;
if the main controller respectively controls the left lens barrel and the right lens barrel to move separately, one of the magnet and the magnetic sensor is respectively embedded on housings of the left lens barrel and the right lens barrel, and the other one is respectively fixed at preset positions corresponding to the left lens barrel and the right lens barrel.

3. The device according to claim 1, wherein the magnet is embedded on a lens barrel housing of the lens barrel module, and the magnetic sensor is fixed at a corresponding preset position of the lens barrel module.

4. The device of claim 1, wherein one end of the magnet is provided with a notch mark.

5. The device of claim 1, wherein the output electrical signal is an output voltage.

6. The device of claim 1, wherein the magnetic sensor is a linear Hall sensor.

7. The device of claim 1, wherein the detection of the output electrical signal of the magnetic sensor is a real-time detection.

8. A lens barrel positional state detection method applied to a virtual reality device, comprising a lens barrel module, a magnet, a magnetic sensor, and a main controller, wherein one of the magnet and the magnetic sensor is embedded on a lens barrel housing of the lens barrel module, and the other one is fixed at a corresponding preset position of the lens barrel module; wherein, the main controller controls the lens barrel module to move and detects an output electrical signal of the magnetic sensor during movement of the lens barrel module so as to determine a positional state of the lens barrel module, wherein the method comprises:
detecting an output electrical signal of a magnetic sensor during movement of the lens barrel module;
determining, based on a movement instruction of the lens barrel module, a positional state of the lens barrel module according to the output electrical signal, wherein determining, based on the movement instruction of the lens barrel module, the positional state of the lens barrel module according to the output electrical signal comprises:
if the movement instruction of the lens barrel module is normally generated within a preset time period, and the output electrical signal is unchanged, determining that the lens barrel module is abnormally stuck during movement.

9. The method according to claim 8, wherein detecting the output electrical signal of the magnetic sensor during the movement of the lens barrel module comprises:
   detecting in real time an output electrical signal of the magnetic sensor during the movement of the lens barrel module.

10. The method according to claim 8, wherein the determining, based on the movement instruction of the lens barrel module, the positional state of the lens barrel module according to the output electrical signal comprises: if the movement instruction of the lens barrel module is normally generated within a preset time period, and the output electrical signal is unchanged and reaches a limit electrical signal during movement of the lens barrel module, determining that the lens barrel module has moved to a preset limit position.

11. A lens barrel positional state detection apparatus configured in a virtual reality device, comprising a lens barrel module, a magnet, a magnetic sensor, and a main controller, wherein one of the magnet and the magnetic sensor is embedded on a lens barrel housing of the lens barrel module, and the other one is fixed at a corresponding preset position of the lens barrel module; wherein, the main controller controls the lens barrel module to move and detects an output electrical signal of the magnetic sensor during movement of the lens barrel module so as to determine a positional state of the lens barrel module, wherein the apparatus comprises:
   an output electrical signal detection module for detecting an output electrical signal of a magnetic sensor during movement of the lens barrel module;
   a lens barrel positional state determination module for determining, based on a movement instruction of the lens barrel module, a positional state of the lens barrel module according to the output electrical signal, wherein the positional state of the lens barrel module comprises the lens barrel module being abnormally stuck during movement or the lens barrel module having moved to a preset limit position.

12. The apparatus according to claim 11, wherein the lens barrel module comprises a left lens barrel and a right lens barrel;
   if the main controller controls the left lens barrel and the right lens barrel to move synchronously, one of the magnet and the magnetic sensor is embedded on a housing of at least one lens barrel within the lens barrel module;
   if the main controller respectively controls the left lens barrel and the right lens barrel to move separately, one of the magnet and the magnetic sensor is respectively embedded on housings of the left lens barrel and the right lens barrel, and the other one is respectively fixed at preset positions corresponding to the left lens barrel and the right lens barrel.

13. The apparatus according to claim 11, wherein the magnet is embedded on a lens barrel housing of the lens barrel module, and the magnetic sensor is fixed at a corresponding preset position of the lens barrel module.

14. The apparatus of claim 11, wherein one end of the magnet is provided with a notch mark.

15. The apparatus of claim 11, wherein the output electrical signal is an output voltage.

16. The apparatus of claim 11, wherein the magnetic sensor is a linear Hall sensor.

17. The apparatus of claim 11, wherein the detection of the output electrical signal of the magnetic sensor is a real-time detection.

* * * * *